United States Patent Office 3,687,613
Patented Aug. 29, 1972

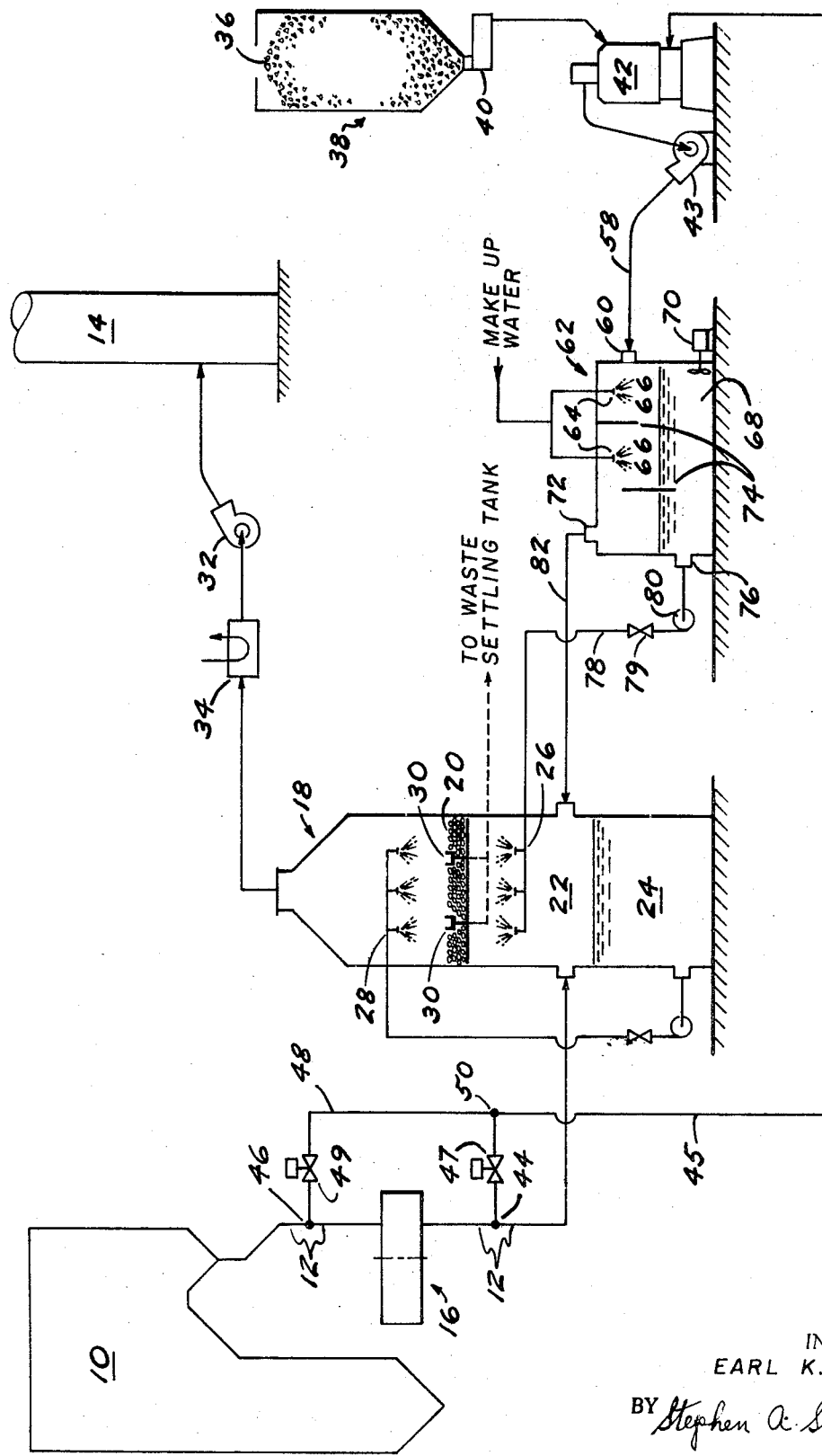

3,687,613
METHOD AND APPARATUS FOR PREPARING AN ADDITIVE FOR INTRODUCTION TO A GAS SCRUBBER
Earl K. Rickard, East Granby, Conn., assignor to Combustion Engineering, Inc., Windsor, Conn.
Filed Oct. 27, 1970, Ser. No. 84,309
Int. Cl. B01d 47/06
U.S. Cl. 423—242
9 Claims

ABSTRACT OF THE DISCLOSURE

A method and apparatus for preparing an additive for use in reacting with sulfur bearing flue gases in a wet scrubber. The additive in the solid state is entrained in a gas stream, is transported to a slurry make-up area, is contacted with water to wet and disentrain the additive to form a slurry and subsequently is conveyed in slurry form to the wet scrubber where it reacts with sulfur oxides in the flue gas admitted to the scrubber. The additive transporting gas, after most of the additive has been removed in the slurry make-up area, is conducted to the flue gas admitting portion of the scrubber.

In the preferred embodiment of the invention, the additive transporting gas is provided by tapping off a portion of the unscrubbed flue gas prior to its admission into the wet scrubber. A coarse, uncalcined additive is pulverized in a pulverizing mill and the flue gas stream is passed through the mill to dry and entrain the additive.

BACKGROUND OF THE INVENTION

Recent concern about air pollution has engendered a growing number of systems designed to remove particulate materials and gases such as $SO_2$ and $SO_3$ from the flue gases discharged from fossil fuel fired steam generating systems and the like. Many of these systems rely on additives introduced into the flue gas stream to react with the gaseous sulfur compounds therein in a manner forming sulfur compounds which may be more easily removed from the flue gas. These systems generally use oxides, hydroxides and carbonates of alkali and alkaline earth metals as the additive, with a strong preference for limestone or dolomite for economic reasons. Most early uses of these additives provided for their introduction into a furnace area where they were calcined and subsequently removed much of the $SO_3$ present in the gases resulting from combustion. The combustion or flue gases containing the partially reacted additive were then further cleaned by passing them through a wet scrubber wherein more of the additive is permitted to react with the gaseous sulfur compounds to form compounds which may be settled out.

More recently, flue gas cleaning systems have been developed which introduce the additive to the wet scrubber without first passing it through the furnace or combustion chamber. These latter mentioned systems are not normally used in combination with additive introduction through the furnace, but may be done. It has been found that additive introduction to the wet scrubber downstream of the furnace is quite effective in reacting with and removing the gaseous sulfur compounds from the flue gas without requiring the sometimes difficult and undesirable introduction of the additive through the furnace. In those arrangements wherein a dust collector is located upstream of the wet scrubber, much of the unreacted additive introduced through the furnace will be removed from the system before it is available for reaction in the scrubber. Introduction of the additive to the scrubber without the pass through the furnace ensures that more of it is available for reaction in the scrubber.

While the additive might be admitted to the scrubber as dry particles entrained in gas, this has certain problems such as the difficulty of evenly distributing the additive to the scrubber bed and the problem of build-up at the scrubber inlet when the dry additive contacts water vapor from the scrubber.

However, introduction of the additive to the scrubber in a slurry has proven quite satisfactory. The slurry is easily transported and may be sprayed for even distribution to the scrubber bed. Therefore, a need exists for an effective and economic means of preparing the raw additive for introduction to the wet scrubber in a readily useable slurry.

SUMMARY OF THE INVENTION

The invention comprises a method and apparatus for converting a solid state additive such as limestone or dolomite into a slurry which may be sprayed or otherwise introduced into a flue gas scrubber associated with a furnace. The additive in the solid state is delivered to an entrainment chamber and entrained in a confined stream of flue gas passed therethrough. The flue gas stream containing the entrained additive is conducted to a slurry make-up area where it is directed into contact with water to wet and disentrain the additive. The disentrained additive is collected as a slurry and subsequently introduced as needed to the wet scrubber. The gas stream, following disentrainment of most or all of the additive, is conducted from the slurry make-up area to the flue gas admitted portion of the scrubber where it joins the flue gases to be scrubbed. Precalcining of the additive permits it to more readily dissolve in water and accordingly to react at a more rapid rate with the gaseous sulfur compounds than if it were not calcined. It has been found, however, that by finely pulverizing an uncalcined additive it will react with the sulfur oxides sufficiently fast to make it commercially attractive.

In the preferred embodiment of the invention a gas swept pulverizing mill receives coarse, uncalcined and sometimes moist limestone or dolomite and pulverizes it to a fine powder. A warm gas stream, obtained by tapping off a portion of the unscrubbed flue gas, is passed through the pulverizing mill to accomplish entrainment therein of the pulverized additive. The additive bearing gas stream then enters a slurry tank where the gas stream is forced, by baffles or the like, to contact water which may exist in the form of a spray or wetted surfaces or both. The additive particles, when wetted by the water, leave the gas stream and collect as a slurry in the bottom of the tank. The water used to contact and wet the additive particles serves as the slurry make-up water, and as such is also the make-up water for the scrubber system. The gas stream exits from the slurry tank after contact with the water and is conducted to the flue gas admitting portion of the scrubber where it rejoins the unscrubbed flue gas and is subsequently cleaned in the scrubber. Any additive particles remaining in the gas after it exits from the slurry tank are available for reaction with sulfur compounds in the scrubber.

The invention is particularly appealing for use with oil fired steam generating plants which, because of conversion from coal firing, have an idle pulverizing mill available.

BRIEF DESCRIPTION OF THE DRAWING

The figure schematically illustrates a wet scrubber for cleaning furnace flue gases and the additive preparation equipment therefore in accordance with the invention.

DESCRIPTION OF THE PREFERRED EMBODIMENT

Referring now to the drawing, a fossil fuel fired furnace 10 as used for the production of heat in steam generating units produces large quantities of gases containing the by-products of combustion. These gases are exhausted from the furnace as a flue gas, are transported away from the furnace by conduit 12, and are ultimately released to the atmosphere, generally by means of a stack 14. Release to the atmosphere of many of the constituents of the flue gas, such as fly ash and the oxides of sulfur, $SO_2$ and $SO_3$, is undesirable. One of the more effective ways of removing these undesirable constituents from the flue gas is by scrubbing the gases with water in a wet scrubber and particularly, scrubbing with an additive in the water. The gaseous sulfur compounds are relatively insoluble in water, but their reaction with an additive in the water, such as dolomite or limestone, is far more rapid and most of the reaction products are relatively insoluble and may be easily collected and removed, as by settling them out. Thus the flue gas in conduit 12 is conveyed, usually through an air preheater 16, to a wet scrubber 18 wherein the above-described scrubbing occurs. Wet scrubber 18 is generally comprised of one or several marble beds 20 onto which is sprayed a watery slurry containing an additive such as limestone or dolomite. Flue gas conduit 12 enters scrubber 18 at a gas admitting zone 22 of the scrubber upstream of marble beds 20. The gas is scrubbed principally by contact with the additive in marble beds 20 and through contact with the additive-bearing sprays. Most of the introduced slurry and reaction products fall to the bottom of scrubber 18 to reactor tank portion 24 thereof where some further reaction between the additive and the sulfur compounds occurs.

Initial introduction of the additive-bearing slurry to scrubber 18 is accomplished by sprayers 26 which may be located above or below marble bed 20. Further, the slurry collected in reactor tank portion 24 of scrubber 18 is usually recycled for most effective use of the additive and scrubber. Introduction of the recycled slurry is accomplished by sprayers 28 which may be located above or below marble bed 20. A preferred arrangement places sprayers 26 below bed 20 directed upwardly thereagainst and sprayers 28 above bed 20 directed downwardly thereon.

Ultimate removal of solid wastes from scrubber 18 occurs through overflow from the bed 20 into pots 30. The overflow is conducted to settling tanks where the solid wastes settle out. The scrubbed flue gases are drawn out of scrubber 18 by inducted draft fan 32 whereupon they pass to the atmosphere through stack 14. Because these gases are now saturated and may form a visable plume when discharged to the atmosphere, means such as heat exchanger 34 are provided for heating the gases to the extent necessary to avoid plume formation.

Applying the gas scrubbing technique previously described requires introduction of the additive to scrubber 18 in the form of a slurry. The method and apparatus of the invention provide effective and economic means for preparing an additive 36, such as limestone or dolomite existing in the solid state, for introduction to scrubber 18 by sprayers 26 in the form of a slurry which will readily react with the sulfur compounds of the flue gas.

Bunker 38 receives additive 36 from a large on-site storage area, not shown, and holds the additive ready for delivery to the slurry make-up system. While the scope of the invention is intended to include additive 36 existing in bunker 38 in a precalcined and pulverized form, its economic advantages are greatest when additive 36 exists in bunker 38 in a coarse uncalcined condition. Additive 36 is delivered, as by a gravimetric or volumetric feeder 40, from bunker 38 to a gas swept pulverizer, such as bowl mill 42. The additive feed rate is determined by the pH of the overflow effluent into pots 30. As the pH decreases, the rate of additive delivery to bowl mill 42 is increased. Additive 36 as received from bunker 38 would most commonly be in chunks having a size of several centimeters and may have high moisture content if it has previously been exposed to the elements. Bowl mill 42 crushes and pulverizes additive 36 to a powder in a well-known manner.

Bowl mill 42 then serves as an entrainment chamber for the pulverized additive 36. A stream of warm gas is passed through bowl mill 42 serving both to dry and to entrain the pulverized additive 36 in the gas stream. It is necessary that the gas admitted to bowl mill 42 have sufficient velocity in passing therethrough to effect entrainment of the additive. This may be accomplished by a fan located upstream of the mill, or more conveniently, by exhauster 43 associated with and located downstream of the mill. That portion of the additive in bowl mill 42 which is too heavy because of size or moisture content or both to be entrained by the gas stream continues to be dried and pulverized until entrainment occurs.

The additive preparation system of the invention taps off a portion of the hot flue gas in conduit 12 prior to its entry into scrubber 18 and uses this for the warm gas stream which is passed through bowl mill 42. The figure depicts two points along flue gas conduit 12 prior to its entry to scrubber 18 at which a portion of the gas may be tapped off. The principal tap occurs at point 44 which is located between air preheater 16 and scrubber 18. Flue gas temperature at this point will be approximately 300° F. The flue gas at 300° F., which leaves flue gas conduit 12 at tap point 44 is conducted through gas conduit 45 to the bowl mill 42 where it effects substantial drying and entrainment of the additive 36 in the bowl mill. Valve 47, located in gas conduit 45, may be used to regulate the flue gas flow from tap point 44 to mill 42 in order to vary the drying capabilities of the gas in the mill. However, if additive 36 has absorbed considerable moisture, it may also be necessary to increase the temperature of the gas entering bowl mill 42. This is accomplished through the use of a second flue gas tap at a point 46 along flue gas conduit 12. Tap point 46 is located upstream of air preheater 16 where temperatures of about 700° F. exist. The hot gas tapped at point 46 is conducted through gas conduit 48 and combined with the gas tapped at point 44 at a junction 50 in gas conduit 45. A valve 49 located in conduit 48 is varied, in combination with valve 47, to provide flue gas temperatures at junction 50 which are intermediate those existing at tap points 44 and 46.

Additive 36, pulverized and entrained in the gas passing through bowl mill 42, is exhausted from the mill through exhauster 43 and is conducted through conduit 58 to entry port 60 in enclosed slurry tank 62. The gas entrained additive is discharged from conduit 58 to the interior of slurry tank 62 where water spraying means, such as nozzles 64 connected to a source of make-up water, develop a water spray 66 positioned to contact the gas-entrained particles. When the particles of additive 36 contact water spray 66, they become wetted and accordingly heavier thereby effecting a disentrainment of the particles from the flue gas transporting them. The disentrained, wetted particles of additive combine in the bottom of slurry tank 62 with the water from spray 66 to form a slurry 68. A mixer 70 keeps slurry 68 well mixed. The volume of slurry 68 in tank 62 is controlled by varying the quantity of make-up water supplied to sprays 66.

A gas exhaust port 72 is located in the upper portion of tank 62 through which the transporting gas may exhaust. In order to ensure that the gas stream containing additive 36 will come into contact with spray 66, baffles 74 are arranged to conduct the addtive-bearing gas stream through spray 66 prior to exhausting at port 72. The baffles 74 additionally force a change in direction of the gas in its passage through tanke 62 which serves to further disentrain particles of additive 36 from the gas stream. Though only a single water spray an baffle arrangement has been shown, it should be appreciated that a plurality of such arrangements may exist in tank 62 to increase the completeness with which the addative is removed from the gas to form slurry 68. A certain amount of additive disentrainment is also effected when the additive particles contact the wetted surface of baffles 74 and the slurry 68.

Slurry 68 leaves slurry tank 62 at slurry exhaust port 76 and is conveyed through conduit 78 to sprayers 26 by means of pump 80. A valve 79 in slurry conduit 78 is varied in response to the volume of slurry in the reactor tank portion 24 of scrubber 18 to control the rate of slurry addition to scrubber 18 from slurry tank 62.

The gas exhausting from slurry tank 62 at exhaust port 72 will contain little of the additive 36 with which it entered the tank. However, because the gas exiting at 72 remains an unscrubbed flue gas containing oxides of sulfur and some small portion of fly ash and entrained additive, it is conducted through gas conduit 82 to scrubber 18 where it rejoins the unscrubbed flue gases from conduit 12 entering flue gas admitting zone 22 and is cleaned in the manner previously described. The small amout of additive remaining entrained in the gas is available for reaction with the sulfur oxides in the scrubber.

This arrangement thus permits a relatively inexpensive additive such as coarse, uncalcined limestone or dolomite which may be exposed to the elements during on-site storage to be used in a wet scrubber. The finely pulverized additive delivered to the slurry make-up tank by the flue gas forms a slurry which will react effectively with the gaseous sulfur oxides in the scrubber and some of the preexisting flue gas is effectively used as an additive drying and transporting medium and is subsequently routed to the scrubber for cleaning.

While I have illustrated and described a preferred embodiment of my invention, it is to be understood that such is merely illustrative and not restrictive and that variations and modifications may be made therein without departing from the spirit and scope of the invention. I, therefore, do not wish to be limited to the precise details set forth but desire to avail myself of such changes as fall within the purview of my invention.

What is claimed is:

1. In a system for removing sulfur oxides from a flue gas wherein said flue gas is admitted to a wet scrubber for reaction with an additive therein, the method of preparing said additive and scrubbing said flue gas comprising the steps of:

(a) feeding said additive in the solid state to an entrainment chamber;

(b) passing a portion of said flue gas through said entrainment chamber whereby said additive is entrained in said gas;

(c) conducting said gas entrained additive to a slurry tank;

(d) contacting the gas entrained additive with water in said tank to wet and disentrain said additive;

(e) collecting the wetted additive and said water as a slurry in said tank;

(f) transporting the additive-bearing slurry to said wet scubber for reaction therein with the sulfur oxides in said flue gas; and (g) conducting said gas from said slurry tank to said scrubber for cleaning therein.

2. The method of claim 1 including the step of pulverizing said additive in said entrainment chamber.

3. The method of claim 2 including the step of varying the temperature of said flue gas passed through said entrainment chamber to control the moisture content of said additive being entrained.

4. The method of claim 2 including the step of varying the flow rate of said flue gas passed through said entrainment chamber to control the moisture content of said additive being entrained.

5. In a plant having a furnace with a hot flue gas outlet, conduit means communicating said flue gas outlet with a scrubber, said furnace producing a hot flue gas containing sulfur oxides and wherein said sulfur oxides are removed from said flue gas by conducting said gas to said wet scrubber, reacting said gas with an additive in said scrubber, and discharging the cleaned gas to the atmosphere, apparatus for preparing said additive and scrubbing said flue gas comprising in combination:

(a) a source of additive in the solid state;

(b) a gas swept pulverizing mill having an additive inlet, a gas inlet and a gas exhaust;

(c) means for delivering said additive to said additive inlet of said mill for pulverization therein;

(d) an enclosed slurry tank having a gas inlet, a gas outlet and a slurry outlet;

(e) first gas conducting means communicating said gas inlet of said pulverizing mill with said conduit means upstream of said scrubber for introducing a portion of said flue gas to said mill;

(f) second gas conducting means communicating with the gas exhaust of said mill and the gas inlet of said slurry tank for conveying gas with entrained additive from said mill to said slurry tank;

(g) third gas conducting means communicating with the gas outlet of said slurry tank and said scrubber for introducing gas exhausted from said slurry tank to said scrubber;

(h) means for establishing gas flow of a portion of said flue gas through said first, second, and third gas conducting means whereby pulverized additive in said mill is entrained in said gas and carried to said slurry tank;

(i) means in said slurry tank for contacting the gas entrained additive with water whereby said additive is disentrained from said gas to form a slurry with said water; and (j) slurry transporting means communicating with the slurry outlet of said slurry tank and said wet scrubber for introducing said additive bearing slurry to said scrubber for reaction with flue gases therein.

6. The apparatus of claim 5 wherein said first gas conducting means includes means for varying the gas flow rate to said mill whereby the rate of heat input to said mill is controlled.

7. The apparatus of claim 5 wherein said means in said slurry tank for contacting said gas entrained additive with water comprise:

(a) means for creating a water spray; and (b) baffle means for directing said gas entrained additive into contact with said water spray.

8. The apparatus of claim 5 wherein said conduit means includes a heat exchanger and said first gas conducting means comprise:

(a) a first flue gas tap upstream of said heat exchanger for diverting flue gas of a first high temperature;

(b) a second flue gas tap downstream of said heat exchanger for diverting flue gas of a second temperature lower than said first;

(c) means for combining in varying proportions said flue gas diverted by said first and second taps respectively to obtain a gas temperature intermediate those existing at said first and second taps; and (d) means for conducting said gas combined from said first and second taps to said pulverizing mill.

9. The apparatus of claim 8 wherein said means in said slurry tank for contacting said gas entrained additive with water comprise:
(a) means for creating a water spray; and
(b) baffle means for directing said gas entrained additive into contact with said water spray.

References Cited
UNITED STATES PATENTS

| | | |
|---|---|---|
| 1,532,647 | 4/1925 | Bergman. |
| 2,066,418 | 1/1937 | O'Mara. |
| 2,142,406 | 1/1939 | Nonhebel et al. ____ 55—228 X |
| 3,160,352 | 12/1964 | Mollring _____ 23—267 R |
| 3,320,906 | 5/1967 | Domahidy. |
| 3,617,212 | 12/1971 | Shah _____ 23—2 SQ |

FRANK W. LUTTER, Primary Examiner

V. GIFFORD, Assistant Examiner

U.S. Cl. X.R.

23—267; 55—73, 222, 228, 233; 110—1 P, 119; 241—18, 261—3